United States Patent [19]
Hope et al.

[11] Patent Number: 4,561,924
[45] Date of Patent: Dec. 31, 1985

[54] AUTOMATIC MATERIAL SPLICER FOR PHOTOGRAPHIC MATERIALS

[76] Inventors: Henry F. Hope; Stephen F. Hope, both of 2421 Wyandotte Rd., Willow Grove, Pa. 19090

[21] Appl. No.: 432,832

[22] Filed: Oct. 5, 1982

[51] Int. Cl.⁴ ...................... B32B 31/00; B65H 19/08; G03D 15/04

[52] U.S. Cl. ...................................... 156/361; 156/353; 156/504; 156/506; 156/507; 156/515; 156/157

[58] Field of Search ................................ 156/353-355, 156/361, 433, 502, 504, 505, 507, 509, 506, 157, 159, 304.3, 515, 251

[56] References Cited

U.S. PATENT DOCUMENTS

| | | | |
|---|---|---|---|
| 3,684,612 | 8/1972 | Pantazis | 156/251 |
| 3,880,699 | 4/1975 | Nishimoto | 156/505 |
| 4,046,614 | 9/1977 | Zahn et al. | 156/353 |
| 4,080,242 | 3/1978 | Komenda et al. | 156/505 |
| 4,368,096 | 1/1983 | Kobayashi | 156/505 |
| 4,374,576 | 2/1983 | Ryan | 156/504 |
| 4,390,388 | 6/1983 | Nagata et al. | 156/504 |

*Primary Examiner*—Edward Kimlin
*Assistant Examiner*—Merrell C. Cashion, Jr.
*Attorney, Agent, or Firm*—John B. Sowell

[57] ABSTRACT

An automatic splicer is provided which is coupled to a continuous running processor. Short strips of roll film are inserted into the splicer and are automatically spliced together as they are advanced through the splicer. When no film is ready to be processed a leader is automatically spliced to the last roll of film to be processed. When the last roll of film is passed through the processor, the system may be placed on standby or stopped.

19 Claims, 7 Drawing Figures

AUTOMATIC MATERIAL SPLICER FOR PHOTOGRAPHIC MATERIALS

BACKGROUND OF THE INVENTION

1. Field of the Invention

The present invention relates to an apparatus for automatically splicing strips of material together as it is being fed into a continuous running photographic processor. More particularly, the present invention relates to a novel splicer adapted to be coupled to a photographic film processor for splicing together different sizes of rolled strip film as it is being advanced into a continuous running processor.

2. Description of the Prior Art

Photographic material such as roll paper and roll film are processed as strips or rolls. Photographic paper is exposed in printers and enlargers until a considerable length on a roll of paper is ready for processing. The roll of exposed paper is then preferably attached to a leader which leads or starts the paper through the processor.

Photographic film in roll form comprises relatively short strips of material which are up to about three feet in length. Since the path of a commercial processor may exceed fifty feet, it is not practical to process rolls of film in continuous processors which require a leader. Automatic and semi-automatic film splicers are commercially available for splicing the ends of roll film together so that they will form a continuous long strip. However, such splicers only connect rolls of film together to form a long strip on a large spool or reel which is later processed in a separate and distinct operation.

There are commercially available processors which have a large number of rolls. Such multi-roll processors are capable of processing individual rolls of film without the requirement of a leader. These processors are more expensive than processors which require a leader and having a large number of rolls require more cleaning and maintenance.

The typical automatic film splicer is adapted to splice together up to six hundred rolls of film per hour. Such splicers open the cartridge or magazine and remove the roll of film. Rolls of the same size of film are trimmed and automatically spliced end to end. After being spliced the rolls of film are taken up on reels which may contain up to a thousand feet of film.

Semi-automatic splicers are available which are adapted to enable splicing together of different sizes of film to form a continuous strip of materal. Such film splicers require an operator at the splicing station and a change of procedure when the film width changes. In recent years fast service photographic processing has become possible. It is no longer necessary for film to be collected from numerous individuals and small retailers for processing at a central large photofinishing laboratory. Small processing laboratories, referred to as mini-labs, are now capable of returning finisihed film and photographic prints in about one hour. Such mini-labs are being located in shopping centers where customers can conveniently leave their film to be processed for one hour while attending to other business. The number of rolls of film being left for processing in any one hour is not great enough to merit the utilization of automatic film splicers and other expensive central laboratory photo finishing equipment.

Presently mini-labs employ the aforementioned expensive multi-roller processors which permit processing of individual rolls of film. Multi-roller processors employ large numbers of rollers that continuously control the leading edge of the photographic material being processed. Such processors require proper preventive maintenance and cleaning to assure that professional results are achieved.

It would be desirable to provide an apparatus which would enable the processing of several rolls of film at a time or small lengths of photographic paper without the expense and maintenance cost associated with the use of multi-roller processors. Not only would such an apparatus lower the cost of photographic processing, but the apparatus would enable small processors such as mini-labs to consistently achieve the high quality results accomplished by large commercial photo finishers.

SUMMARY OF THE INVENTION

It is the prinicipal object of the present invention to provide a novel photographic material splicer adapted to be coupled to a continuous running processor.

It is another primary object of the present invention to provide a novel photographic material splicer which creates its own continuous strip of material as it is being advanced into a photographic processor.

It is another primary object of the present invention to provide a novel photograhic material splicer that will automatically supply and splice a strip of leader material to photographic material as it is being processed when no additional photographic material is presently available for processing.

It is a general object of the present invention to provide an automatic photographic material splicer which is capable of being coupled directly to standard and commercially available low cost continuous running strip processors.

It is yet another general object of the present invention to provide an automatic splicer for photographic material that splices different widths and lengths of strip material together as it is being advanced into a processor.

It is another general object of the present invention to provide sensors in an automatic splicer for measuring the amount of photographic material being advanced into the processor.

According to these and other objects of the present invention there is provided an automatic splicer which is coupled to a continuous running processor. Photographic film or paper introduced into the input feed rolls of the splicer as separate short strips is automatically spliced together at the abutting ends to form a continuous strip of material which is threaded completely through the continuous running processor. When no photographic material is available to be fed into the continuous running processor, a piece of leader paper is automatically supplied and spliced onto the last piece of the photographic material to be introduced into the splicer. When the last strip of photographic material being run has passed through the continuous running processor, then the splicer and the processor may be stopped until more photographic material is available for processing.

DESCRIPTION OF THE PREFERRED EMBODIMENT

For purposes of this application, a continuous running processor is preferably a processor of the type which requires a leader that must be threaded through the processing machine. Such leader processors are less expensive than multi-roller processors that automatically thread short strips of film and paper through the processor. The present invention automatic splicer is also fully operable with a multi-roller processor that is continuously running.

For purposes of this application, the term photographic material used herein means either photographic film or paper. For purposes of explanation the preferred embodiment will refer to film because it is the more difficult photographic material to handle in a processor and splicer.

Figure 1:
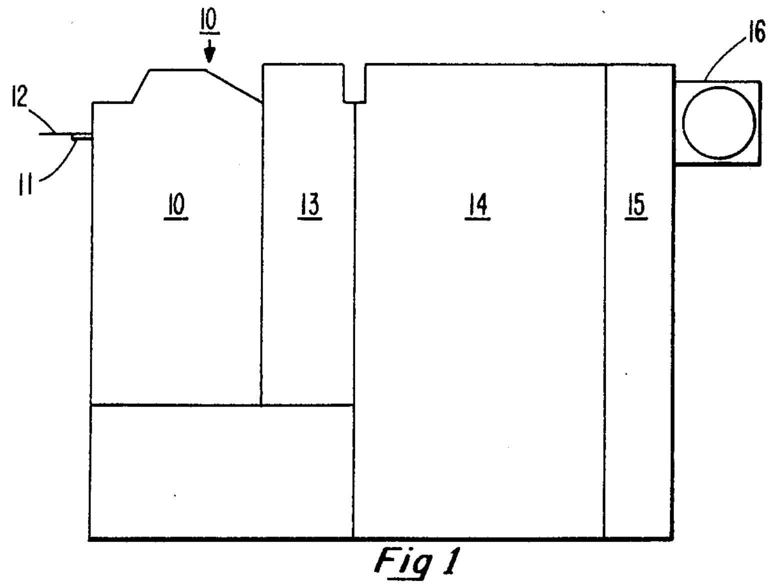
FIG. 1 is a schematic right side view showing the arrangement and location of the elements of the novel splicer coupled to a continuous running processor.

FIG. 1 is adapted to show the elements and subassemblies that cooperate with the novel automatic splicer 10. The splicer 10 has an input shelf or slot 11 extending from the splicer 10. Film 12 placed into the input slot 11 is transferred partially through the splicer 10 where the leading edge of film is stopped for a short time at the splicing station inside splicer 10. After being spliced to the trailing edge of another strip of film or a leader, it is transferred into a dancing roll take up station 13. The film is preferably fed into the dancing roll take up station 13 faster than it is being fed into the processor 14. This permits the processor 14 to operate at a continuous running speed. The film leaving the processor 14 is passed through a drying station 15 before it is transferred to the take up reel 16.

In one preferred mode of operation several rolls of film are accumulated for processing together. With the apparatus shown in FIG. 1 in the RUN mode it is only necessary to feed the strips of roll film into the input slot 11 one after the other. Each individual roll of film has its leading edge attached to the trailing edge of the roll of film which was previously entered into the splicer. After the splicing operation the continuous strip of film is advanced through the splicer 10 until the trailing edge of the last entered roll of film is stopped in the splicing station. Several rolls of film can then be stored in the dancing roll take up station 13 even as the processor continues to process part of the stored supply of film 12. It is expected that both small and large photo finishes will have time when no more film is available that needs to be processed. Sensing switches are provided in the take up station 13 which sensed this condition and supply the leading edge of a paper leader to the splicing station where it is spliced to the trailing edge of the last strip of roll film which has been stopped with its trailing edge in the splicing station. After the leader is passed completely through the processor 14 in dryer 15 the complete system may be stopped or placed on standby where it is ready to be used again for processing more rolls of film without any preparation or conditioning of the system.

Figure 2:
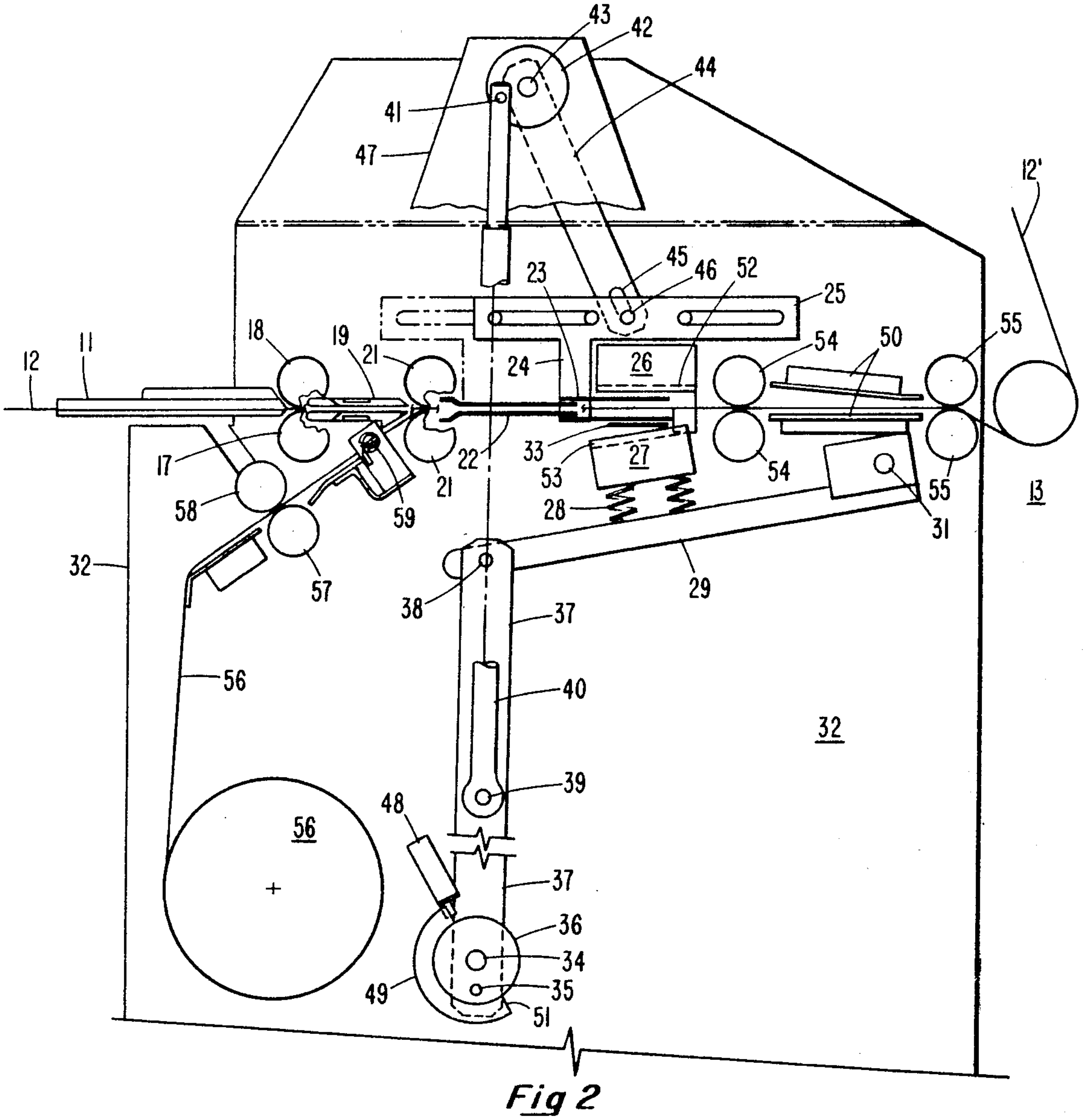
FIG. 2 is an enlarged schematic section view of the right side of the novel splicer having most of the right side frame removed to show the feed rolls, drive rolls and material path.

Referring now to FIG. 2 which is an enlarged right side elevation of the splicer 10. Input slot 11 forms a narrow parallel passageway to prevent the curling of roll film 12 which has a spring-like bias when stripped from a cartridge or spool. The film is pushed into input feed rolls 17, 18 which are shown as a pair of pinch rolls. The rolls 17, 18 are being driven in the RUN mode and push film 12 into the first stationary guides 19 which form a narrow substantially parallel passageway to prevent curling of the film 12. Pinch rolls 21 are being driven in synchronism with rolls 17, 18 and pushed the film 12 into the second stationary guides 22. In the preferred embodiment shown, reciprocating guides 23 are mounted on a pair of downward extended support arms 24 on the reciprocating frame 25. Guides 23 are slidably mounted over the outside of guides 22 and extend to a position past the center of heated blocks 26, 27. Movable block 27 is mounted on springs 28 carried on the lever 29 pivoted at pin 31. The pin 31 is preferably connected to the side frame 32.

When the leading edge of the strip of film 11 reaches the center of blocks 26, 27 it is stopped by the control means opposite the trailing edge of the previously entered strip of film 12' which has been stopped opposite the heating blocks 26, 27. A piece of splicing tape 33 is located opposite the butting ends of the film 12, 12' and is preferably located below guide 23.

When the splicing operation starts, the splicer motor turns shaft 34 and pin 35 on disk 36 clockwise. Lever 37, which is pivotally connected by pin 38 to lever 29, moves upward and closes the lower block 27 upon the stationary block 26. Lever 40 is also connected to lever 37 through pin 39 which causes it to move upward. The upper end of lever 40 is connected by a pivot pin 41 to the disk 42. Disk 42 is fixed to shaft 43. When shaft 43 is rotated clockwise, the actuator arm 44 is moved from its position shown to a vertical position which retracts the reciprocating guides 23 from their extended position between the blocks 26, 27 to a retracted position outside of blocks 26, 27. The slot 45 in actuation arm 44 cooperates with the cross brace 46 that is connected to the two reciprocating side frames 25. The side frames 25 are slidably mounted on the left side frame 32 and the right side frame 47 (only partially shown in FIG. 2). The photocell sensor 48 comprises a diode and photoelectric cell mounted on opposite sides of a disk segment 49. The sensor 48 detects the end 51 of the segment 49 which causes the control means to stop shaft 34 for a predetermined period of time while the splicing tape 33 is being attached to the abutting ends of film 12, 12' in the splicing station between blocks 26, 27.

Blocks 26, 27 carry attached knife blades 52, 53 which are located on the far end of the blocks in FIG. 2. Blades 52, 53 are biased together to form a scissors pair which cut tape 33 as the blocks 26, 27 are closed. When blocks 26, 27 are again opened, guides 23 are again moved to their extended position between the blocks 26, 27 where they will form a narrow guide for the trailing edge of the roll of film 12 being processed. As will be explained hereinafter, rolls 17, 18 and 21 at the input of the splicing station are again driven as well as the two pairs of output drive rolls 54 and 55 which causes the trailing edge of film strip 12 to be moved into the splicing station and stopped in the position now shown by film strip 12'. Film strip 12' is moved into the dancing roll take up station 13. Guides 50 between rolls 54 and 55 assist in threading leader paper 56 through the system but are not essentially required for guiding the film once it is spliced in the splicing station.

To summarize the sequence of events, the trailing edge of the strip of roll film 12' was held by the pairs of pinch rolls 54, 55 opposite blocks 26, 27 until a piece of splicing tape 33 connects it to the leading edge of the strip of roll film 12. Rolls 17, 18 and 21 continue to be driven in the RUN mode except when stopped temporarily during a splicing operation.

Rolls 54, 55 are normally stopped and are being driven when they are advancing a roll of film 12 into the splicer 10, 13.

If no new film 12 is being fed into the splicer 10, the store of film in the take up means 13 will become exhausted. When this condition is sensed, a piece of leader paper 56 on a reel is driven by leader paper drive rolls 57, 58 pass rotary knife 59 into the input drive rolls 21 which causes the leading edge of the leader paper 56 to be positioned between the blocks 26, 27 opposite the trailing edge of the last roll of film which was fed into the splicer 10. The sequence of events described above is now repeated to attach the splicing tape to the trailing edge of the last roll of film and to the leading edge of the leader paper 56. Again the input feed rolls 17, 18 and drive rolls 21, 54, and 55 are driven which causes the leader paper 56 to be advanced completely through the take up means 13 as well as the processor 14 and dryer 15. The control means comprise counters which determine when a predetermined length of leader paper 56 is passed through the leader paper drive rolls 57, 58 as will be explained in greater detail hereinafter.

Figure 3:
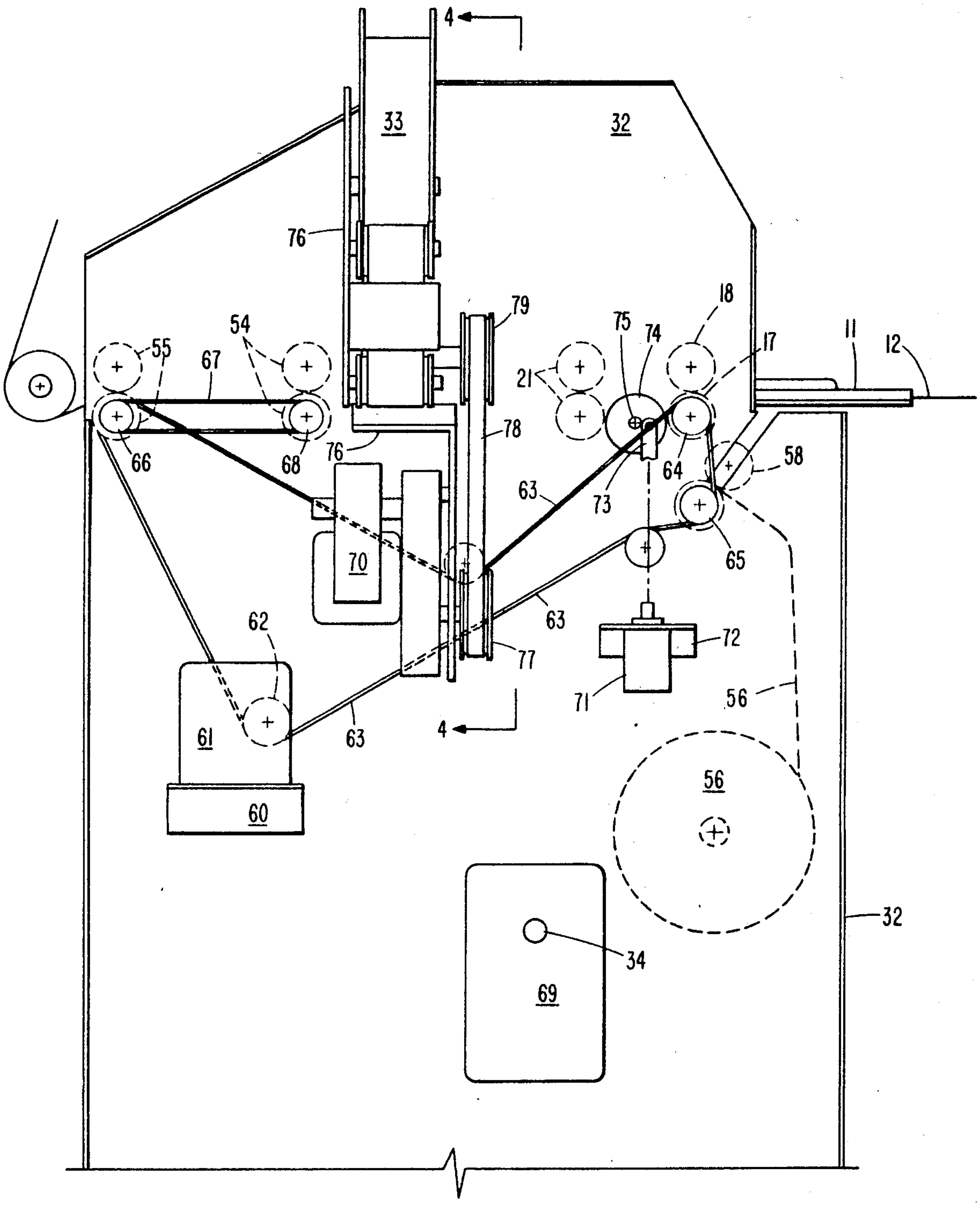
FIG. 3 is an enlarged schematic left side view of the novel splicer showing the drive motors and relays employed to operate the splicer.

Refer now to FIG. 3 showing the left side frame 32. Input feed rolls 17, 18, input drive rolls 21, output drive roll pairs 54, 55 and leader paper drive rolls 57, 58 are shown in phantom line because they are located behind the left side frame 32. Roll drive motor 61 on bracket 60 drives pulley 62 and belt 63. The driven pulley 64 drives roll 17. The driven pulley 65 drives leader paper drive roll 57. The driven pulley 66 drives lower output drive roll 55. The shaft of the lower output drive roll 55 is coupled to the pair of drive rolls 54 through belt 67 and pulley 68.

Splicer motor 69 is located on the left side frame 32 and has its shaft 34 extending through the frame 32 to the right side of the splicer 10. A relay (solenoid) 71, supported by bracket 72 on frame 32, is provided with a lever 73 which is pivoted at disk 74 and the relay 71. Disk 74 is connected to a shaft 75 which passes through frame 32 and actuates the rotary knife blade 59 which is adapted to cut the leader paper 56. If the leader paper 56 is being applied to the splicer 10 when a new roll of film is fed into the input feed rolls 17, 18 then the leader paper 56 will be simultaneously cut and stopped at the rotary knife 59. The trailing edge of the leader paper which is already past the rotary knife 59 passes through the input drive rolls 21 and will be stopped in the splicing station where it is attached to the leading edge of the new strip of roll film just entering the splicer 10. The leader paper 56, except during start-up, standby and shut down operations does not require any predetermined length of leader paper to be run through the splicer 10.

Figure 4:
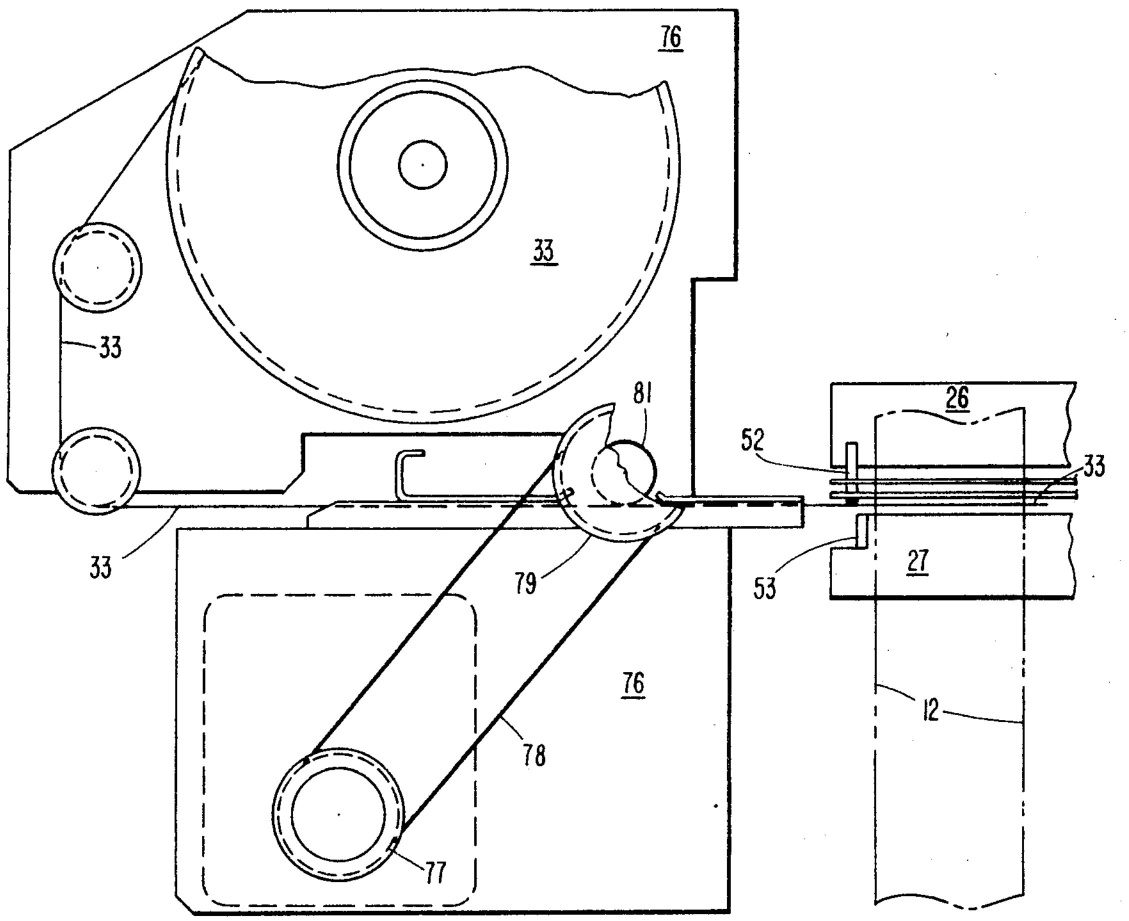
FIG. 4 is an enlarged schematic view in elevation of the splicing tape supply apparatus taken at lines 4-4 of FIG. 3.

The reel of splicing tape 33 is mounted on a bracket 76 on frame 32. A motor 70 is also mounted on bracket 76 and has a driving pulley 77 which drives belt 78. Refer also to FIG. 4 as well as FIG. 3 which shows the driven pulley 79 driving a friction pinch roll 81. The friction pinch roll 81 engages the top of the splicing tape 56 and is adapted to feed a length of splicing tape under the reciprocating guides 23 at or near the time the splicing operation occurs. When motor 70 is actuated, pulley 77 is driven one revolution and is stopped and held by the one revolution motor 70 which has its own brake. The diameter of pinch roll 81 determines the length of splicing tape 33 supplied past knife blade 52, 53. The length of tape supplied is preferably longer than the widest piece of film or leader to be passed through the splicer 10.

Figure 5:
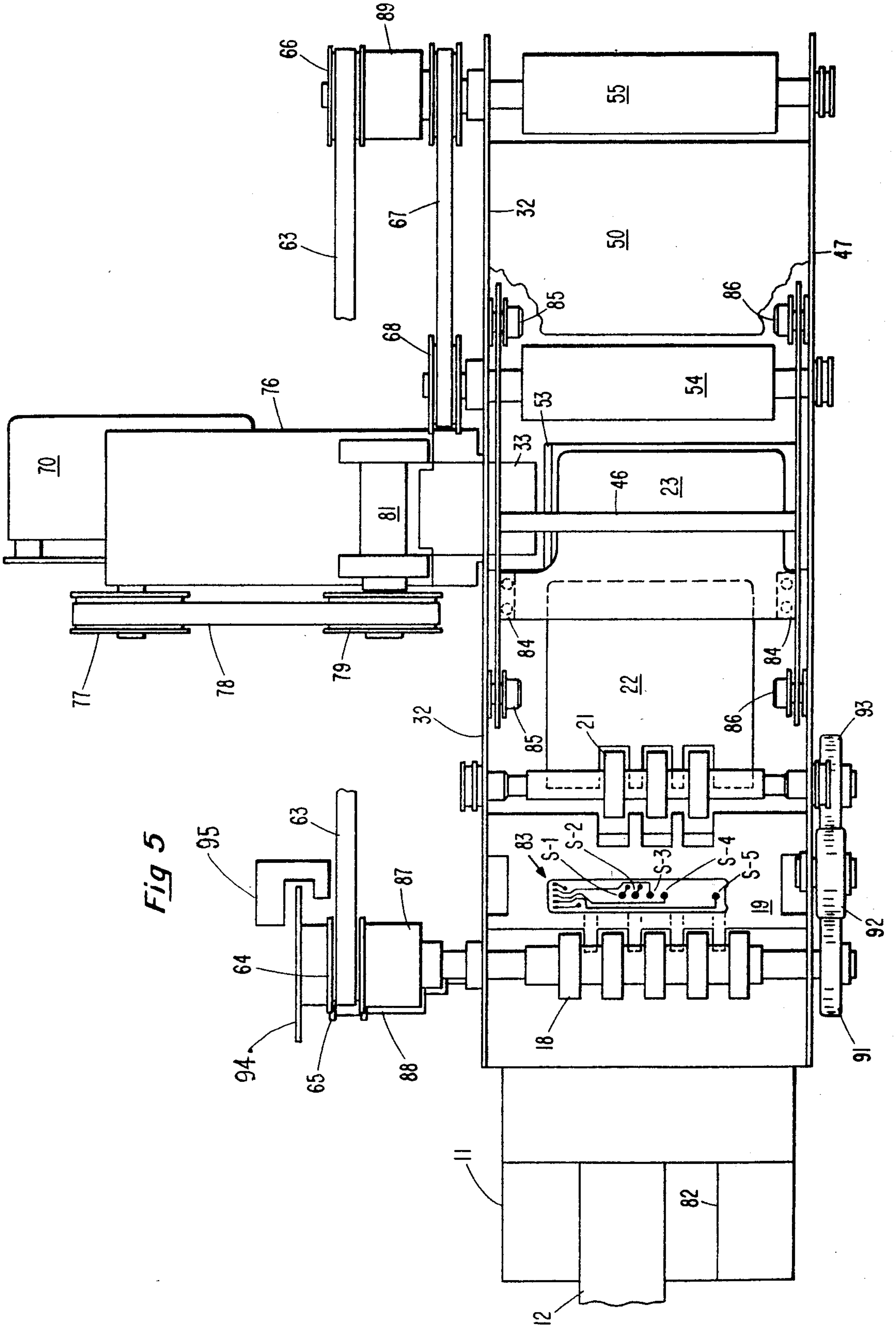
FIG. 5 is an enlarged schematic top view of the novel splicer showing the location of the rolls and guides which move the material to and from the splicing station.

FIG. 5 is a top view of splicer 10 which also shows the splicing tape supply mounted on bracket 76. The end of the tape 33 is shown in a position opposite the knife blades 53 on block 27 before it is moved to a position between blocks 26, 27. Rolls 18 and 21 are shown as a plurality of individual rolls on a common shaft. This construction permits the ends or fingers of guides 19 and 22 to extend closer to the center of the rotational axis of the rolls. Output rolls 54, 55 are shown as solid rolls. It will be understood that the term rolls and roll means includes the equivalent of the preferred embodiment rolls shown. Where two pairs of rolls are adapted to transfer material without permitting the material to curl, belts and/or rollers may be employed. If the splicer 10 is constructed for use with photographic paper alone, the requirement for narrow parallel guides and/or belts or a combination of belts, guides and rolls is not as critical because photographic paper in roll form is provided from larger diameter rolls and has a spring or curl bias.

Film 12 is pushed into slot 11 which has a recess guide 82. As the film 12 passes through rolls 17, 18 into guides 19, it is sensed by photocell sensing means 83 comprising sensors S1 to S5 mounted in apertures in guides 19. As will be explained in detail hereinafter the sensing means 83 not only senses the leading and trailing edges of the strip of film but also senses the width and length of film so that the area of the film being processed is automatically determined and used to drive chemical processing replenishment pumps preferably located in the processor 14.

Guides 22 extend into a portion of guides 23. Guides 23 are mounted on arms 24 which extend downward from reciprocating frames 25. Small mounting and spacer blocks 84 are provided for mounting guides 23 to arms 24. The reciprocating frame members 25 are slidably mounted on stub shafts 85 and 86 located on the side frames 32 and 47. The cross brace shaft 46 forms a spacer for frame members 25 as well as providing a convenient member for applying uniform force to both frame members 25 when being positioned by actuator arm 44 (arm 44 is best shown in FIG. 2).

FIG. 5 best shows brake-drive clutches 87, 88, 89 which are adapted to couple the driving force from belt 63 and motor 61 to the drive shafts which support rolls 17, 57 and the lower roll 55. Such clutches may be electrically energized to stop the shafts or to couple the shafts to pulleys 64, 65 and 66. While the preferred embodiment shows one motor capable of driving all of the drive rolls, the clutches must be engaged to couple the motor to the respective drive shafts.

Rolls 17 and 18 are driven as a pair of pinch rolls. Gears 91, 92 and 93 show one way of driving a second pair of rolls 21 from rolls 17, 18. Belt 67 and pulley 68 show an alternative way of driving a second pair of rolls 54 from the driven shaft of a first pair of rolls 55. The means shown both assure that all drive rolls drive at the same speed. It is possible to remove the motor 61 which drives belt 63. The drive rolls and belt 63 may be driven from a pulley located in the processor, thus, synchonizing the processor with the splicer.

Attached to the driven pulley 64 is a slotted disk 94 which rotates between the arms of sensor 95. The sensor 95 contains a photocell and a photoelectric detector. The slots of the disk 94 cause alternate opening and closing of the light path, thus, creating a train of pulses synchronized with the movement of all the rolls which drive film or leader. The output of sensor 95 is employed as a tachometer.

Figure 6:
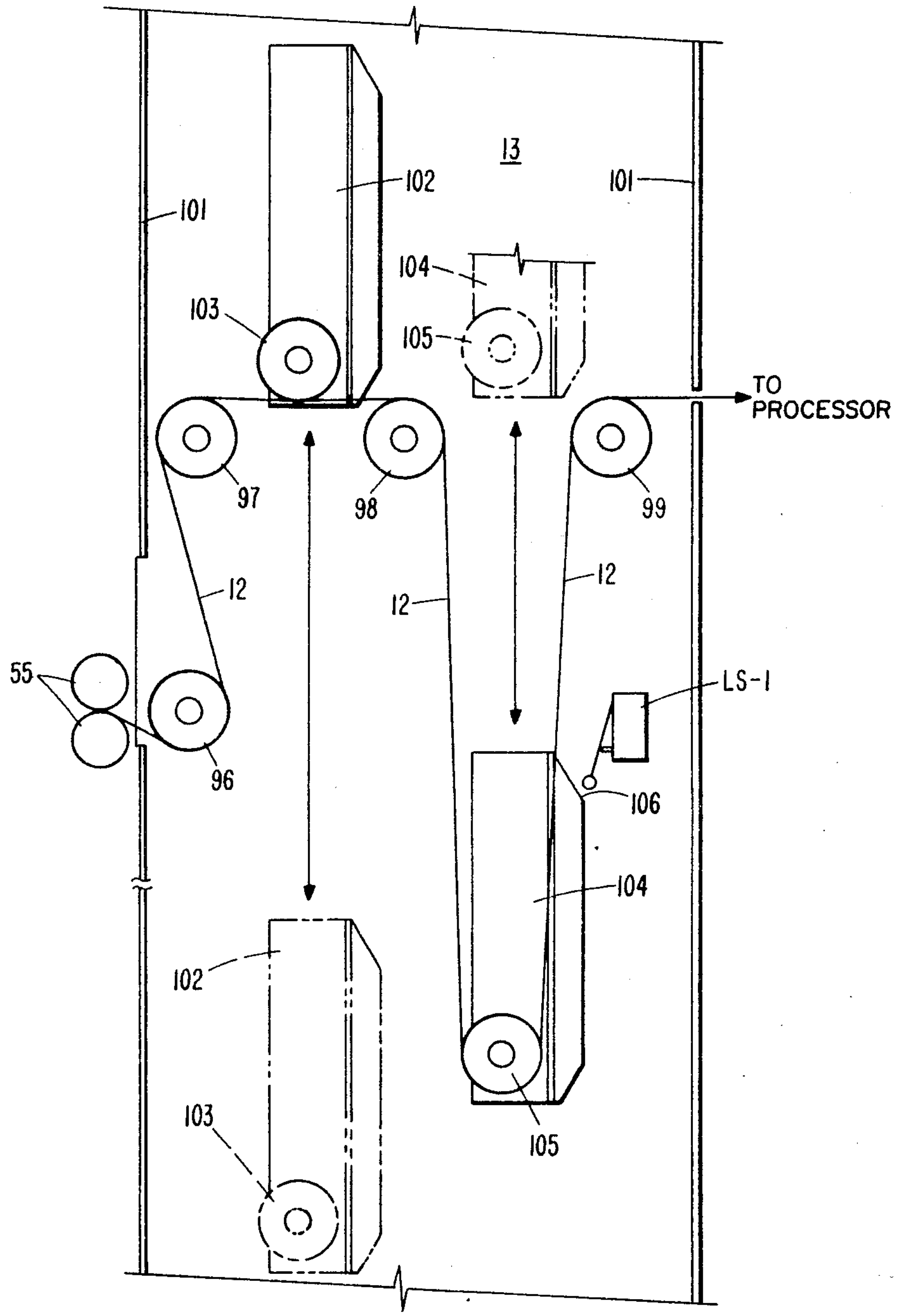
FIG. 6 is an enlarged schematic view of the right side of the dancing roll take up apparatus.

Refer now to FIG. 6 showing schematically the dancing roll take-up means 13. Since the splicer 10 is designed to run faster than the processor 14, film 12 being introduced into the splicer 10 must be accumulated. Dancing rolls are used in numerous types of equipment to take up slack in web and tape transport apparatus and do not require detailed explanation herein. Film 12 enters the take-up means 13 from rollers 55 which are being driven. Idler rolls 96, 97, 98 and 99 are fixed on stub shafts supported on frame 101. Arm 102 is slidably mounted on guides (not shown). Idler roll 103 on arm 102 is shown in its topmost position being supported by film 12. Arm 102 is also shown in phantom lines indicating a lower position where it takes up slack of the film 12 on idler roll 103. The arm 102 is designed to extend several feet to permit storage of several rolls of film in take-up means 13. Arm 102 is lightly counterbalanced so that the tension of film 12 will cause it to rise before the second arm 104 which is more heavily counterbalanced than arm 102. Arm 104 and its idler roll 105 are shown at their upper most position in a normal RUN mode of operation. The upper cam 106 on arm 104 engages limit switch LS-1 when there is only minimum of film left in storage. When cam 106 engages switch LS-1, a signal is initiated which starts leader paper 56 through the splicer 13 because there is no additional film 12 being loaded into the splicer 10. Arm 104 and roll 105 is shown in phantom lines at an uppermost position where they may be locked or held when the system is being threaded with leader paper. It will be understood that other LS switches may be employed in the means 13 to cooperate with the other cams on arms 102 and 104 to sense where the arms are positioned during a RUN mode of operation. An explanation of the logic of such further limit switches is not required to explain the basic operation of the system shown.

Figure 7:
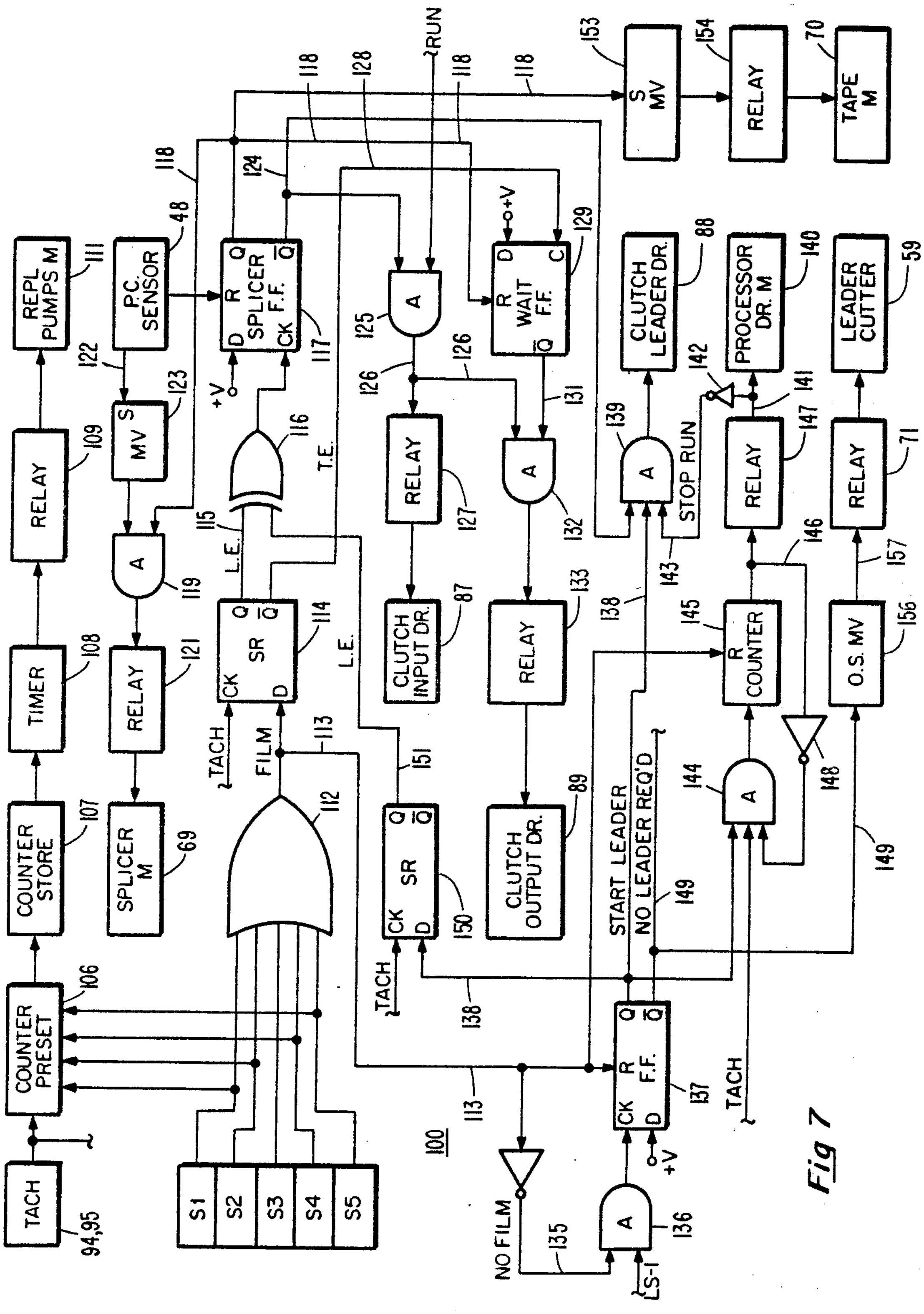
FIG. 7 is a schematic block diagram of the principal elements which comprise the electrical control means that control the sequence of operations of the automatic splicer.

Refer now to FIG. 7 which is a simplified schematic block diagram employed to explain the mode of operation of the control means 100. First assume that the system shown in FIG. 1 has power on and the splicer has been run to accept several rolls of film. The tachometer 94, 95 is generating pulses indicative of the speed of belt 63 and the driven rollers. When the sensors S1 to S5 sense a new roll of film entering splicer 10, they preset counter 106 which is driven by tachometer 94, 95. The count accumulated in counter 107 is indicative of the area of film passing sensors S1 to S5. When a predetermined count is reached timer 108 is actuated for a predetermined length of time. Timer 108 causes relay 109 to energize the replenishment pumps 111 which pump fresh chemicals into the processor 14.

When any sensor S1 to S5 senses film at OR gate 112, a signal indicative of the presence of film is raised on line 113. The film signal on line 113 enables shift register 114 which is then driven by the tachometer signals at the clock input. The shift register 114 serves as a delay and a measure of the length of film being driven past rolls 17, 18. The Q output of shift register 114 goes high at line 115 when the leading edge of the strip of film being sensed is properly positioned in the splicing station opposite blocks 26, 27. The leading edge signal on line 115 is passed through exclusive OR gate 116 and applied to the clock input of splicer flip-flop 117. Splicer flip-flop 117 generates a signal on line 118 which is applied to AND gate 119. AND gate 119 is already enabled so that relay 121 is energized to start splicer motor 69. After motor 69 has rotated shaft 34 180 degrees, the blocks 26, 27 are closed and guides 23 are retracted. The sensor 48 senses the edge 51 of disk segment 49 and generates a signal on line 122 which sets one shot multivibrator 123 and disables AND gate 119 for a predetermined length of time to complete the splicing operation. After multivibrator 123 times out it again enables AND gate 119 and splicer motor 69. When sensor 48 again senses the edge of disk segment 49 the splicer motor 69 is stopped when the splicer flip-flop 117 is reset.

The mode of operation which stops the leading edge of film 12 in the splicing station opposite blocks 26, 27 may be accomplished by other timing means and sensors which are apparent to those skilled in the art. During the splicing operation there is no movement of the photographic material in the splicer 10. The input drive rolls 17, 18, 21 are disabled. Since the splicer flip-flop 117 is low at its $\overline{Q}$ output on line 124 this signal may be employed to interrupt the input drive rolls 17, 18. When line 124 goes low and the system is in the RUN mode with film present, AND gate 125 is adapted to generate the signal on 126 indicative of an interrupt signal at relay 127 which energizes input brake-drive clutch 87 that is coupled to roll 17.

The output brake-drive clutch 89 which drives rolls 54, 55 must be enabled at the end of the splicing operation. The trailing edge signal on line 128 is employed to drive the $\overline{Q}$ output of the WAIT flip-flop 129 low which results in stopping the trailing edge of the previous roll of film in the splicing station at the proper position for splicing. When the Q output of the splicer flip-flop 117 goes low at the end of the splicing operation it resets the WAIT flip-flop 129 and generates an output signal on line 131 which is combined with the restart signal on line 126 in AND gate 132. Relay 133 and output clutch 89 are then enabled so that they can drive rolls 54, 55 at the same time rolls 17, 18 start driving. When the trailing edge of the film 12 now arrives in the splicing station opposite blocks 26, 27 the signal on line 128 again disables clutch 89 when the $\overline{Q}$ output of flip-flop 129 goes low. The system is now ready for another roll of film or a strip of leader paper.

In the event no additional film is ready to be run for a period of about ten minutes, the dancing roll take-up means 13 will eventually energize upper limit switch LS-1 and the FILM signal on line 113 is low indicative of a no film condition. The low no film signal on line 113 is inverted at inverter 134 to provide a high signal on line 135. AND gate 136 produces a signal at the clock input of flip-flop 137. Flip-flop 137 goes high at its Q output generating a signal that is indicative of the need of leader paper at the splicing station. The start leader paper signal on line 138 is applied to AND gate 139. The signal on line 124 is high when the splicer flip-flop 117 is disabled. The stop RUN signal is low on line 141 and is inverted at inverter 142 to produce a high signal on line 143. These two signals produce an output to the brake-drive clutch 88 which in this instance includes a relay for proper operation. The signal on line 138 which starts rolls 57, 59 and leader paper 56 is applied to AND gate 144. Counter 145 was reset by the low film signal on line 113 and its output is low on line 146. The low signal on line 146 is inverted in inverter 148 and counter 145 counts the tachometer input signals. Counter 145 is designed to produce an output on line 146 after approximately fifty feet of leader paper 56 has passed through the rolls 47, 48. However, the leader paper is not yet spliced to the film positioned in the splicing station opposite blocks 26, 27. The signal on line 138 is also applied to shift register 150 which causes a Q output signal on line 151 when the leading edge of the leader paper is positioned in the splicing station opposite the trailing edge of the last roll of film placed in the splicer 10. The signal on line 151 is applied to exclusive OR gate 116 which sets the splicer flip-flop 117. The splicer flip-flop 117 repeats the splicing operation described herein before when film was spliced to film.

During the splicing operation clutches 87, 88 and 89 are disabled. Clutch 88 is stopped by the signal on line 124 to AND GATE 139 during this operation. When the splicing operation is completed clutches 88, 89 cause rolls 21, 54, 55 to be enabled and supply leader paper 56 to the splicer until the count output on line 146 is reached. When the line 146 goes high, relay 147 is energized and the signal may be employed to stop the processor motor 140. The leader paper 56 at this point is long enough to be threaded through the system and is not cut.

The system may be manually restarted after it is stopped. If during the time the leader paper 56 is being fed into the system and the counter 145 has not indicated that the leader paper has passed through the processor, it is possible to insert a new roll of film which will be spliced to the leader paper. The flip-flop 137 will be reset by the signal on line 113 and the output from flip-flop 137 on line 149 will go high. The signal on line 138 goes low stopping clutch 88 which supplies leader paper 56. Also one-shot multivibrator 156 generates a short pulse on line 157 which causes relay 71 to actuate rotary cutter 59 and to cut the leader paper. The output drive rolls 54, 55 continue to pull the trailing edge of the leader paper 56 into the splicing station 13 where it is perfectly timed to abut the leading edge of the film 12 as it arrives at the splicing station. The splicer flip-flop 117 is again actuated as the film 12 and paper 56 are stopped in the splicing station and then restarted after the splicing operation is completed.

Each time the splicer flip-flop 117 is actuated, the signal on line 118 is applied to multivibrator 153 which actuates relay 154. Relay 154 actuates the one revolution motor 61 which supplies the splicing tape 33 to the splicing station just before the blocks 26, 27 are closed.

Having explained a preferred embodiment splicer which is operable with a continuous running processor under control of control means 100 it will be understood that FIG. 7 is not an engineering drawing but is a logic drawing better understood by those skilled in the art. Thus, those skilled in the art will be able to implement the schematic logic drawing and achieve the same results without the requirement for using the same engineering structure.

The detailed description of the preferred embodiment has been explained with reference to rolls or strips of photographic film which has a tendency to curl. Thus, it will be understood that the processing of photographic paper which has less tendency to curl does not present as difficult a problem and the same type mechanism shown in splicer 10 may be enlarged to accommodate any desirable width of photographic paper. The drive rolls and the control means 100 illustrated herein are capable of processing either photographic roll film or strips of photographic paper.

We claim:

1. A photographic material splicer of the type adapted to automatically connect the ends of photographic material and a leader strip together as it is being advanced into a continuous running processor, comprising:

input feed means for introducing strips of photographic material into said photographic material splicer as it advances toward said processor, input drive rolls spaced downstream from said input feed means for advancing said strips of photographic material and said leader strip, a first pair of stationary guides located intermediate said input feed means and said input drive rolls, splicing means spaced downstream from said input drive rolls, said splicing means having a movable block for attaching a piece of splicing tape onto one edge of said strips of photographic material to be processed to form a continuous strip of photographic material, means for supplying pieces of splicing tape to said splicing means, a second pair of stationary guides located intermediate said input drive rolls and splicing means, reciprocating guide means extending from said second stationary guides into said splicing means opposite said movable block, said reciprocating guide means being retracted from their extended position in said splicing means to a retracted position outside said movable block when said movable block is being closed to attach a piece of splicing tape to the edges of said pieces of material in said splicing means, means for automatically supplying a leader tape to said splicing means during the absence of strips of said photographic material in said input feed means, sensing means located downstream from said input feed means and upstream from said splicer means for sensing the leading edge and the trailing edge of said strips of photographic material being introduced into said input feed means, output drive means downstream from said splicing means for supplying strips of said spliced photographic material with a leader tape attached into said continuous running processor, control means coupled to said sensing means for stopping said input feed means when the leading edge of said photographic material is in said splicing means adjacent the trailing edge of a piece of material stopped in said splicing means, said control means further comprising means for operating said movable block to attach said splicing tape to said pieces of material opposite said movable block and then starting said input feed means and said output drive means to supply said photographic material into said continuous running processor, and said control means further comprising means for supplying a leader tape to said splicing means when said sensing means senses the trailing edge of a last strip of photographic material being fed into said continuous running processor.

2. A photographic material splicer as set forth in claim 1 wherein said means for automatically supplying a leader tape to said splicing means during the absence of strips of said photographic material in said input feed means comprises leader tape input feed rolls coupled to said control means.

3. A photographic material splicer as set forth in claim 2 wherein said means for automatically supplying a leader tape to said splicing means further comprises leader tape guides and leader tape cutter means intermediate said leader tape input feed rolls and said input drive rolls.

4. A photographic material splicer as set forth in claim 3 wherein said leader tape cutter means are controlled by said control means to cut said leader tape when the continuous processor is running and when strips of photographic material are again being fed into said input feed means.

5. A photographic material splicer as set forth in claim 3 wherein said leader tape cutter is controlled by said control means to cut said leader tape when all photographic material being fed to said continuous running processor has been processed.

6. A photographic material splicer as set forth in claim 1 which further includes dancing roll take-up means located between said output drive means and said processor for accumulating a supply of photographic material to be advanced into said continuous running processor.

7. A photographic material splicer as set forth in claim 1 wherein said splicing means comprises heaters in said blocks.

8. A photographic material splicer of the type set forth in claim 6 wherein said control means further includes sending switches in said dancing roll take-up means for sensing the position of said dancing rolls and for indicating when the supply of photographic material in said dancing roll take-up means has been exhausted.

9. A photographic material splicer of the type set forth in claim 8 wherein said means for automatically supplying a leader tape comprises leader material supply means adapted to be energized by said sensing switches in said dancing roll take-up means for supplying leader material to said splicing means when the supply of photographic material is exhausted in said dancing roll take-up means.

10. A photographic material splicer as set forth in claim 9 which further includes cutter means positioned opposite the leader material supply means for cutting said leader material when a new piece of photographic material is introduced into said input feed rolls and for stopping said leader material under control of said control means.

11. A photographic material splicer as set forth in claim 10 wherein said control means further includes means for stopping the cut trailing edge of said leader material in said splicing means when a new piece of photographic material is being introduced into said input feed rolls.

12. A photographic material splicer as set forth in claim 8 wherein said control means further includes means for determining when the length of leader material being supplied to said splicer, said dancing roll take-up means and said processor is long enough to extend through said processor and means for stopping said processor.

13. A photographic material splicer of the type adapted to automatically splice the ends of material together as it is being advanced into a continuous running processor, comprising:

input feed rolls for introducing a strip of photographic material to be processed into said photographic material splicer, input drive rolls spaced downstream from said input feed rolls for advancing said strip of photographic material in said splicer, splicing means spaced downstream from said input drive rolls, said splicer means having a movable block and a cooperating stationary block for attaching a piece of splicing tape onto one edge of said strip of photographic material being introduced into said splicer to form a continuous strip of material, means for supplying pieces of splicing tape to said splicing means, first photographic material guides extending from said input feed roll to said input drive rolls, said guides forming a narrow substantially parallel passageway to prevent curling of said photographic material, sensing means located downstream from said input feed rolls for sensing the leading edge and the trailing edge of said strip of photographic material being introduced into said input feed rolls, second stationary photographic guides extending from said input drive rolls to said splicing means, said second guides forming a narrow substantially parallel passageway to prevent curling of said photographic material, reciprocating photographic material guides extending from said second stationary photographic material guides into the center of said splicing means opposite said blocks, said movable guides being retracted from their extended position between said blocks to a retracted position outside of said blocks when said blocks are being closed, output drive rolls downstream from said splicing means, and control means responsive to said sensing means for stopping said input feed rolls and said input drive rolls when the leading edge of said photographic material is in said splicing means opposite said blocks and the trailing edge of a piece of material is stopped in said splicing means, said control means further comprising means for subsequently closing and opening said blocks to attach said splicing tape to said pieces of material and subsequently starting said input feed rolls said input drive rolls and said output drive rolls to position the trailing edge of said strip of photographic material in said splicing means and then stopping the trailing edge of said piece of photographic material in said splicing station ready for a subsequent splicing operation.

14. A photographic material splicer as set forth in claim 13 wherein said reciprocating photographic guides are mounted over the outside of said second stationary photographic guides.

15. A photographic material splicer as set forth in claim 14 which further includes, a splicer drive motor energized by said control means for raising and lowering said movable block, and a reciprocating frame for supporting said reciprocating photographic material guides coupled to said splicer drive motor.

16. A photographic material processor of the type employing a leader to conduct strips of photographic material through processing tanks in the leader processor, characterized by:

an automatic material splicer coupled to the input of said leader processor, said automatic material splicer comprising:

splicing means having a movable block for automatically splicing the ends of successive strips of photographic material together as they are advanced through the automatic splicer before entering said leader processor, means for automatically supplying a leader strip to the trailing edge of the last strip of photographic material being advanced through the splicer so that a leader is automatically provided in the processor when no photographic material is being fed into the automatic splicer, input feed means adapted to accomodate different widths of photographic material and to advance said photographic material into said automatic splicer, sensing means located downstream from said input feed means and upstream of said splicing means for sensing the width, the leading edge and the trailing edge of said strips of photographic material, control means coupled to said sensing means for stopping said input feed means when the leading edge of said photographic material is in said splicing means adjacent the trailing edge of a piece of material stopped in said splicing means, and reciprocating guide means extending into said splicing means and being retracted from their extended position in said splicing means to a retracted position outside said movable block when said movable block is being closed to attach a piece of splicing tape to the edges of said pieces of material in said splicing means.

17. A photographic material processor as set forth in claim 16 wherein said processor is continuously running and processing photographic material at a predetermined constant speed and said control means further includes means responsive to said sensing means for detecting when a new strip of photographic material is being fed into said input feed means, said automatic splicing means having cutter means for cutting the trailing edge of said leader strip and for splicing the leading edge of said new strip of photographic material to the traling edge of said leader strip.

18. A photographic material processor as set forth in claim 16 which further includes dancing roll take-up means located between said splicing means and said processor for accumulating a supply of photographic material to be advanced into said processor, sensing switches in said dancing roll take up means, and leader material supply means responsive to said sensing switches for supplying leader material to said splicing means when the supply of photographic material is exhausted in said dancing roll take-up means.

19. A photographic material processor as set forth in claim 16 which further includes cutter means positioned opposite said means for automatically supplying a leader strip for cutting said leader strip when a new piece of photographic material is introduced into said input feed rolls.

* * * * *